Dec. 29, 1959 H. J. JANSEN 2,918,930
ABSOLUTE PRESSURE REGULATOR
Filed Sept. 27, 1956 2 Sheets-Sheet 1

INVENTOR.
HOWARD J. JANSEN
BY
ATTORNEYS

Dec. 29, 1959  H. J. JANSEN  2,918,930
ABSOLUTE PRESSURE REGULATOR
Filed Sept. 27, 1956  2 Sheets-Sheet 2

INVENTOR.
HOWARD J. JANSEN
BY
ATTORNEYS

United States Patent Office 2,918,930
Patented Dec. 29, 1959

2,918,930

ABSOLUTE PRESSURE REGULATOR

Howard J. Jansen, Kenmore, N.Y., assignor to the United States of America as represented by the Secretary of the Air Force Application September 27, 1956, Serial No. 612,571

3 Claims. (Cl. 137—81)

This invention relates to a pressure regulator, and more particularly, to an absolute pressure regulator which is independent of ambient pressure conditions.

Certain aircraft controls utilize a pressure reducing valve in which a spring force acting upon an effective area is balanced against gas pressure, said spring force being varied to automatically change the outlet pressure and thereby balance the new spring load. In this type of common regulator the effective area is furnished by a piston or diaphragm, the spring side of which is open to atmospheric pressure, and the regulated gas pressure on one side of the piston or diaphragm must balance the spring force plus the atmospheric pressure on the other side of said piston or diaphragm. Thus, there results a corresponding change or fluctuation in the regulated or outlet pressure with changes in altitude. However, many controls in an aircraft require an absolute pressure regulator wherein the outlet or regulated pressure remains at a constant value regardless of changes in the surrounding atmospheric conditions. It is with this latter type of regulator that the subject invention is concerned.

It is an object of the invention therefore to provide an absolute pressure regulator that is independent of atmospheric pressure.

It is a further object of the invention to utilize an absolute pressure regulator wherein regulated pressure is balanced by a spring force acting on an effective area plus zero pressure.

A still further object of the invention resides in the utilization of a spring urged pressure reducing valve acting on an evacuated bellows which assures that the regulated pressure remains constant.

An additional object of the invention is the provision of an absolute pressure regulator which is adjustable to regulate the outlet pressure between predetermined limits.

Other objects and advantages of the invention will become apparent from the following description, taken in connection with the accompanying drawings in which like reference characters refer to like parts in the several figures.

Figure 1:
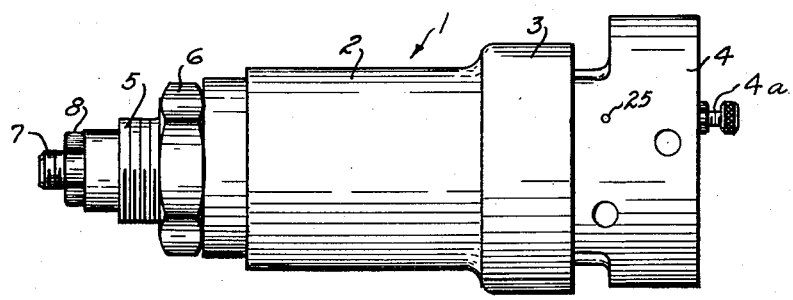
Fig. 1 is a side view of the pressure reducing valve of the invention ready for assembly in an appropriate aircraft control system.

With particular reference to Fig. 1 of the drawings, the absolute pressure regulator is illustrated generally at 1. Said regulator 1 includes a generally cylindrical body 2, an enlarged portion 3 at one end thereof (the right hand end is viewed in Fig. 1), an externally threaded sleeve 5 with a check nut 6 engaging therewith, and an inner adjusting screw 7 with a second check nut 8 in engagement therewith, the purpose and operation of which will be hereinafter described.

Figure 2:
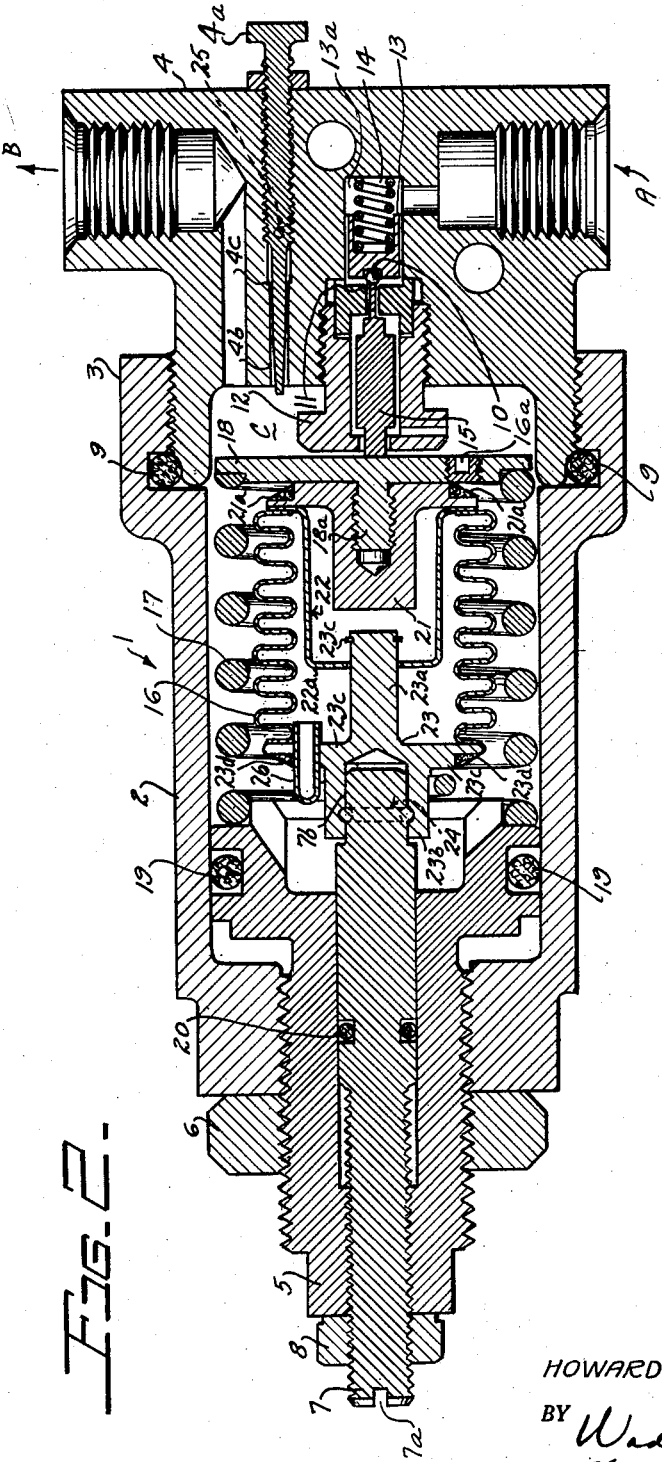
Fig. 2 is a longitudinal sectional view of the pressure reducing valve of Fig. 1 illustrating the details of the absolute pressure regulator.

As clearly seen in Fig. 2 of the drawings, a housing assembly 4 is telescopically positioned within the enlarged portion 3 of the body 2 and is sealed thereto by the packing 9. Positioned within said housing assembly 4 is located the inlet pressure reducing valve 10, the valve seat 11, the valve seat retainer 12, the valve follower 13, the valve spring 14, and the valve pin 15. Said valve follower 13 is formed with longitudinally disposed passageways 13a to permit the flow of gas from the inlet port A to the valve 10. Within the body 2 of said absolute pressure regulator 1 is positioned the evacuated bellows assembly 16, and the bellows spring 17. The tubular element indicated at 26 represents the connection between the interior of said bellows assembly 16 and a motor (not shown) used for evacuation thereof. After said evacuation, the connection is broken and the opening melted to seal the interior of said bellows from the outside. Positioned within the enlarged portion 3 of said body 2 is the plate 18 to which plate one end of said spring 17 is attached, the other end of which is affixed on the sleeve 5. The latter sleeve 5 is sealed to the body 2 by means of the packing 19 and the adjusting screw 7, in turn, is sealed to said sleeve 5 by the packing 20. Said housing assembly 4 also includes an inlet port A and an outlet port B whose relationship to the pressure reducing valve 10 will be hereinafter described. As seen clearly in said Fig. 2, plate 18 incorporates an externally threaded somewhat elongated projecting element 18a extending inwardly towards the inner end of inner adjusting screw 7 in threaded engagement with the plate supporting member 21 which plate supporting member 21 is welded at 21a to the evacuated bellows assembly 16. Affixed to said plate supporting member 21 is a U-shaped support bracket 22 with the base 22a thereof having an opening in slidable engagement with the screw-connecting member 23. Said screw-connecting member 23 consists of a yoke-type member having a preferably cylindrical relatively narrow projecting portion 23a in slidable engagement with support bracket 22, and a relatively enlarged cylindrical yoke portion 23b having a central opening adapted to receive the inner end 7b of inner adjusting screw 7. Said inner end 7b is rotatably affixed within the central opening of said enlarged portion 23b by means of a ring 24 affixed to the circumference thereof in rotatable engagement with an inside circumferential groove incorporated in the wall of said central opening. Said screw connecting member 23 also incorporates a pair of transverse legs 23c extending at right angles to the longitudinal axis of said projecting portion 23a which legs 23c are welded at 23d to bellows assembly 16. A set screw 16a is incorporated in the plate 18 to prevent relative movement between said plate 18 and said plate supporting member 21. Stop means of any desirable type are indicated at 23e which stop means 23e prevent separation between projecting portion 23a of screw-connecting member 23 and support bracket 22.

Figure 3:
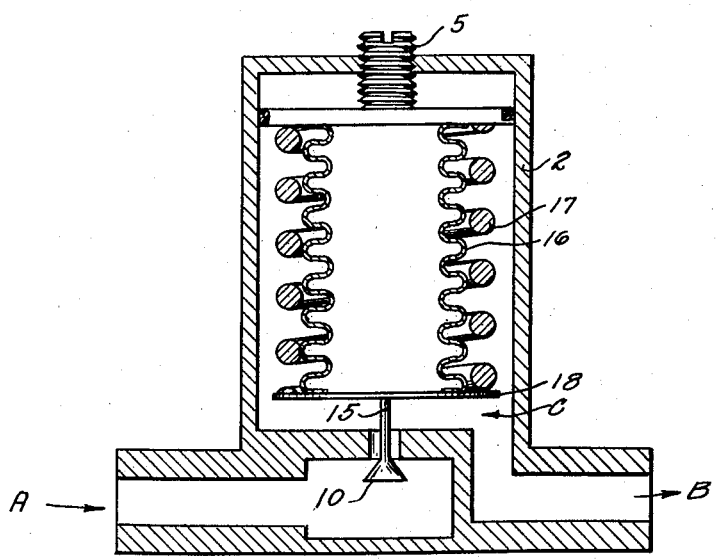
Fig. 3 is a schematic view of the pressure reducing valve and regulator of Figs. 1 and 2.

Referring particularly to Figs. 2 and 3 of the drawings, the operation of the absolute pressure regulator 1 of the instant invention will now be described. Prior to the admission of gas to the inlet port A, the force of the bellows spring 17 holds the plate 18 against the valve seat retainer 12 and thereby holds the valve pin 15 down (as viewed in Fig. 3) or to the right (as viewed in Fig. 2). This action unseats the valve 10 and upon admitting gas under 1,000 lbs. per square inch pressure to the port A, flow of gas begins through the passageways 13a past the valve follower 13, valve 10, valve pin 15, and into the chamber C. Said flow of gas results in a pressure drop in the gas thus admitted so that the gas pressure in said chamber C is lower than that at port A. Pressure in said chamber C acts against the bellows assembly 16 and the bellows spring 17 tending to compress them and thereby resulting in moving the plate 18 away from the valve seat retainer 12 and permitting the valve pin 15, valve 10, and valve follower 13 to move under pressure of the valve spring 14. This latter movement reduces the clearance between said valve 10 and valve seat 11 thereby effecting a further drop in pressure in the flowing gas and, subsequently, in said chamber C. The gas pressure in said chamber C continues to drop until it reaches a value where it exactly balances the opposing force of said bellows spring 17, at which point all movement of the parts previously described stops. At this time, gas remains flowing through the above described path into the chamber C on through to the outlet port B. The chamber C is vented or bled to the atmosphere by a vent or bleeder opening 25 shown in Fig. 1 which bleeder opening 25 extends downwardly into a channel 4b (see Fig. 2) which communicates with said chamber C. A needle 4a having a seat in said channel 4b at 4c is provided to normally close said vent or bleeder opening 25 except for test purposes as will be seen hereinafter. The leakage of gas from chamber C provided by said vent or bleeder opening 25 when opened exceeds the minimum leakage through pressure reducing valve 10. As seen clearly in Fig. 2 of the drawings, gas flows under pressure from the inlet port A through an intercommunicating channel past the pressure reducing valve 10 into the chamber C and from there into a second intercommunicating channel in connection with the outlet port B. The pressure of the gas in chamber C and thus at the outlet port B can be controlled at anywhere in the range between approximately 10 lbs. per square inch absolute and 100 lbs. per square inch absolute with an inlet pressure at port A of approximately 1,000 lbs. per square inch absolute. This control of gas pressure can be effected by varying the compression on the bellows spring 17 through means of the adjustment of the screw thread sleeve 5 which may be moved either in or out as selected. The essential feature of the pressure regulator of the instant invention is that regardless of the surrounding atmospheric pressure, the selected outlet pressure at port B will remain constant since changes in outside pressure conditions has no effect on the pressure in the chamber C and hence the regulated outlet pressure at the port B. In other words, for a given adjustment on the sleeve 5 effecting a predetermined compression on the bellows spring 17, a given gas pressure is maintained in the chamber C and at the port B.

As generally seen in Fig. 3 and more specifically illustrated in Fig. 2 of the drawings, the pressure regulator 1 of the present invention may be adjusted in a manner hereinafter described to obtain a selected pressure between 10 and 100 pounds per square inch at the outlet port B. For example, if it is desired to deliver gas to said outlet port B at a pressure of 85 lbs. per square inch, it is only necessary to install a gage at said port B, open the vent or bleeder opening 25 from chamber C to atmosphere by backing off needle 4a slightly, and then apply 1,000 lbs. per square inch gas pressure at the inlet port A. To obtain the selected gas pressure of 85 lbs. per square inch at the outlet port B, the bellows assembly 16 which is fixedly engaged with the inner adjusting screw 7 is held at the screwdriver slot 7a and check nut 6 is loosened while the sleeve 5 is adjusted (in for increased pressure—out for reduced pressure) until 85 pounds per square inch is registered on the gage at said port B. The check nut 6 is then tightened and the check nut 8 is loosened. Finally, said bellows assembly 16 is turned down until it bottoms by adjusting the inner adjusting screw 7 by means of a screwdriver at slot 7a. The bellows assembly 16 "bottoms" when the end of the projecting portion 23a of the screw-connecting member 23 (which is being moved towards the right as viewed in Fig. 2) engages with the plate supporting member 21 driving the latter together with the plate 18 affixed thereto towards the valve seat retainer 12 until said plate 18 abuts against the face of said valve seat retainer. Said bellows assembly 16 is then backed-off one and one half (1½) turns for correct adjustment and then check nut 8 is tightened. In this manner, any desired outlet pressure may be delivered at outlet port B in the range between 10 and 100 lbs. per square inch. It is emphasized that the needle 4a is utilized to close vent or bleeder opening 25 except for test purposes to determine whether there is any leakage of gas admitted into the pressure chamber C as hereinbefore described.

Thus, a new and unique system for maintaining a constant outlet pressure has been developed—a system that is simple in operation and yet assures that the desired pressure is maintained at the outlet. Moreover, the absolute pressure regulator of the present invention is adaptable for use with a plurality of aircraft controls and may be used for higher pressures as well without departing from the scope of the invention. This latter use may be accomplished by merely installing a heavier bellows spring and providing an evacuated bellows structure capable of withstanding higher pressures.

I claim:

1. An absolute pressure regulator comprising a body having a pressure chamber therein, a pressure supply inlet in said body admitting predetermined high pressure gas, a pressure outlet in said body in communication with said chamber delivering predetermined absolute low pressure gas, a pressure supply conduit in communication between said supply inlet and said chamber, a pressure reducing valve means including a valve and a valve seat in said supply conduit opening outwardly toward said pressure supply inlet, a valve follower incorporating a plurality of longitudinally disposed passageways in communication between said inlet and said valve and a spring normally urging said valve follower in the valve-closing direction to effect a drop in pressure in the high pressure gas admitted into said supply inlet, a valve actuator stem between said valve and said chamber movable toward said valve to open said valve to admit predetermined high pressure gas into said chamber and a valve seat retainer in engagement between said valve actuator stem and said valve seat, a movable support in said chamber remote from said valve actuator stem, valve actuator means in said chamber adjacent said stem and said valve seat retainer for actuation thereof to open and control closing of said valve, spring means between said movable support and said valve actuator means yieldably urging said valve actuator means toward said stem to engage said valve seat retainer and unseat said valve, bellows supporting means adjustably mounted in said movable support in remote relation to said valve actuator means and adjustable toward and away from said valve actuator means, and a fully evacuated bellows fixed at one end to said valve actuator means and at its other end to said bellows support maintaining said predetermined absolute low pressure gas at said outlet at a constant value independently of changes in ambient atmospheric pressure.

2. In an absolute pressure regulator adapted for mounting in an aircraft comprising a hollow body having a pressure chamber, a supply inlet adapted to receive gas of a predetermined relatively high pressure and an outlet adapted to deliver gas of a predetermined relatively low pressure, means for insuring and maintaining the delivery of a relatively low constant absolute pressure to said outlet independent of changes in ambient atmospheric pressure at various altitudes, said means comprising a first communicating passage between said supply inlet and said pressure chamber, a pressure-reducing valve assembly positioned in said first passage between said supply inlet and said pressure chamber, means regulating and controlling said pressure-reducing valve assembly, said pressure-reducing valve assembly comprising a valve yieldingly movable towards its passage closing position to increasingly reduce the pressure of the relatively high pressure gas flowing therethrough into said pressure chamber from said supply inlet and a relatively elongated valve operating element affixed to said valve at one end thereof and extending inwardly into said pressure chamber at the other end thereof and including spring urged valve follower means initially moving said valve towards its closed position and said valve-operating element inwardly towards said pressure chamber, and an adjustably mounted bellows assembly mounted in said pressure chamber adjustable to a predetermined position and having plate means affixed thereto and movable therewith to contact and subsequently move said valve-operating element and said valve to a predetermined position reducing the relatively high pressure gas admitted in said supply inlet to a selected amount, said bellows assembly comprising an evacuated bellows mounted in said pressure chamber adjacent said valve operating element, an adjustably mounted relatively elongated screw positioned in one end of said body and terminating in an inner portion adjacent said bellows remote from said valve assembly, an interconnecting member having an outer yoke portion incorporating a central opening and said screw having a ring circumferentially disposed thereon in fixed relation and adapted to rotatably affix the inner portion of said screw in said outer yoke portion an intermediate portion including a pair of transversely disposed legs affixed to the end of said bellows remote from said valve assembly and a relatively elongated inner portion having circumferentially disposed stop means adjacent the inner end thereof, a U-shaped support bracket having a base portion with an opening at one end thereof in slidable engagement with the inner portion of said interconnecting member and limited in one direction of movement by said stop means to prevent separation between said support bracket and the inner portion of said interconnecting member, said plate means including a valve operating element-engaging plate-supporting member affixed to the other end of said support bracket and the other end of said bellows, an externally threaded sleeve element positioned in the end of said body remote from said valve assembly surrounding said screw and terminating in an inner outwardly flared end circumferentially sealed to the inside walls of said hollow body and forming the end of said pressure chamber remote from said valve assembly, and a bellows spring surrounding said bellows and confined at one end thereof by said outwardly flared end of said sleeve element, said plate means also including a valve-operating element engaging plate member affixed to said plate-supporting member and the other end of said bellows spring and engaging and retaining said valve operating element in a predetermined position to restrict the flow of and progressively reduce the pressure of the high pressure gas admitted to said supply inlet and delivered to said outlet in accordance with a predetermined adjustment of said sleeve element and screw, said plate member in continuous contact with said valve operating element to initially retain said valve in its fully opened position and movable to a predetermined position under action of said bellows on introduction of high pressure gas into said chamber in accordance with a preselected adjustment of said bellows and bellows spring to reduce said high pressure gas to a predetermined constant absolute low 3. An absolute pressure regulator comprising a main body having a closed pressure chamber with an inlet port adapted to admit relatively high pressure gas and an outlet port adapted to deliver relatively low pressure gas in opposite communication with said pressure chamber, pressure-reducing means between said inlet and said chamber comprising an inlet pressure reducing valve, a relatively elongated valve pin in engagement at one end with said valve, spring-urged valve follower means urging said valve to its fully seated position and valve seat means having a relatively enlarged end remote from said valve terminating adjacent one end of said valve pin, and means positioned in said chamber independent of ambient atmospheric conditions for delivering an absolute pressure to said outlet port comprising a bellows assembly positioned in said chamber including a fully evacuated bellows rigidly attached at one end to a first adjustable element mounted in one end of said main body remote from the relatively enlarged end of said valve seat means and having a member attached to its other end in freely-mounted condition in continuous contact with said valve pin and initially held in contact with said enlarged end of said valve seat means until a predetermined pressure of high pressure gas admitted into said chamber has been exceeded and a bellows spring overcoming the collapsing tendency of said fully evacuated bellows plus the effect of a predetermined pressure of high pressure gas admitted into said chamber positioned in circumferential relation to said bellows and in contact at one end thereof with a second adjustable element regulating the resisting pressure thereof to a preselected predetermined amount and attached at its other end to said member mounted on one end of said bellows contacting said valve pin.

References Cited in the file of this patent

UNITED STATES PATENTS

| | | |
|---|---|---|
| 1,169,250 | Fulton | Jan. 25, 1916 |
| 1,507,073 | Lewis | Sept. 2, 1924 |
| 1,658,951 | Stitt | Feb. 14, 1928 |
| 2,342,659 | Grove | Feb. 29, 1944 |
| 2,381,358 | Marshall | Aug. 7, 1945 |
| 2,571,667 | Bondurant | Oct. 16, 1951 |
| 2,638,107 | Teague | May 12, 1953 |
| 2,639,726 | Golob | May 26, 1953 |
| 2,764,996 | Brown | Oct. 2, 1956 |